2 Sheets--Sheet 1.

J. H. VAN HOUTEN.
Revolving Retorts for Manufacturing Fixed Gas.
No. 157,432. Patented Dec. 1, 1874.

Witnesses.
Geo. H. Wilson.
Geo. W. Francis.

Inventor.
James H. Van Houten
per
Oliver Drake Atty

THE GRAPHIC CO. PHOTO-LITH. 39 & 41 PARK PLACE, N.Y.

J. H. VAN HOUTEN.
Revolving Retorts for Manufacturing Fixed Gas.
No. 157,432. Patented Dec. 1, 1874.
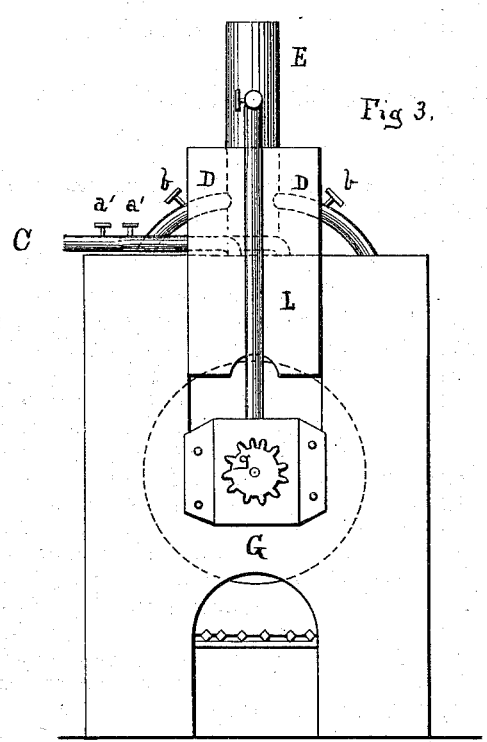
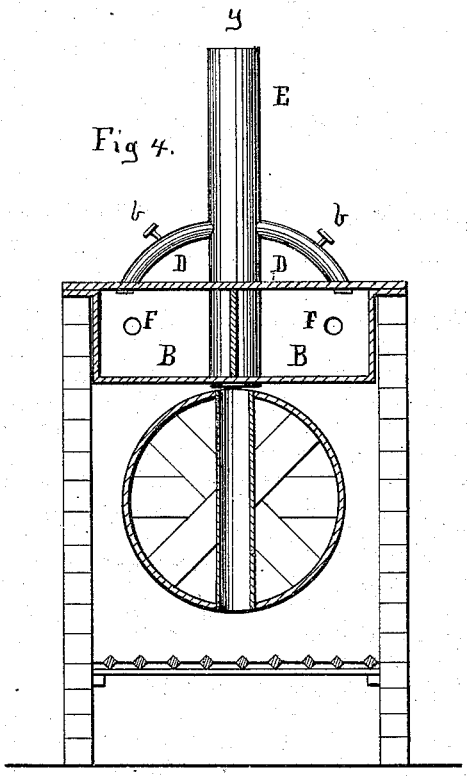
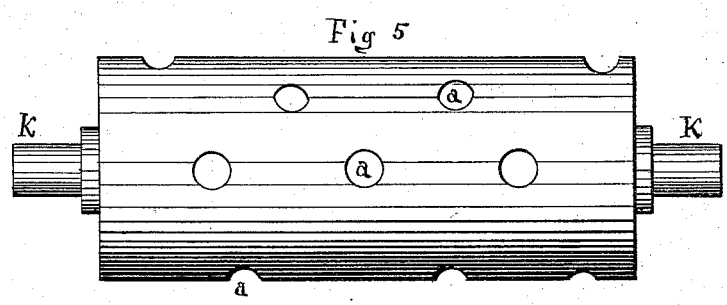

UNITED STATES PATENT OFFICE.

JAMES H. VAN HOUTEN, OF NEWARK, NEW JERSEY.

IMPROVEMENT IN REVOLVING RETORTS FOR MANUFACTURING FIXED GAS.

Specification forming part of Letters Patent No. 157,432, dated December 1, 1874; application filed September 29, 1874.

*To all whom it may concern:*

Be it known that I, JAMES H. VAN HOUTEN, of the city of Newark, in the county of Essex and State of New Jersey, have invented certain new and useful Improvements in Apparatus for Making Fixed Gas from Petroleum, &c.; and I do hereby declare that the following is a full, clear, and exact description thereof, which will enable others skilled in the art to which it pertains to make and use the same, reference being had to the accompanying drawings, and to the letters of reference marked thereon, which form a part of this specification.

This invention has for its object the furnishing to individuals or communities a low-priced apparatus for making a superior fixed gas from hydrocarbons or other oils, which is simple in construction and operation, and is both reliable and durable.

My invention consists in a retort which is provided with a number of flues, $a$, running through at intervals, either crosswise or longitudinally, in which the hot air circulates as the retort revolves, thus greatly aiding in the process of making gas, and reducing the liability of the retort burning out, or being othwise injured, as stationary retorts are very liable to do, in consequence of the intense and continued heat and corrosive action of the material used in making gas upon one portion of the retort only, as will be obvious to any intelligent and practical observer.

To enable others skilled in the art to make and use my invention, I will proceed to describe its construction and operation.

Figure 1:
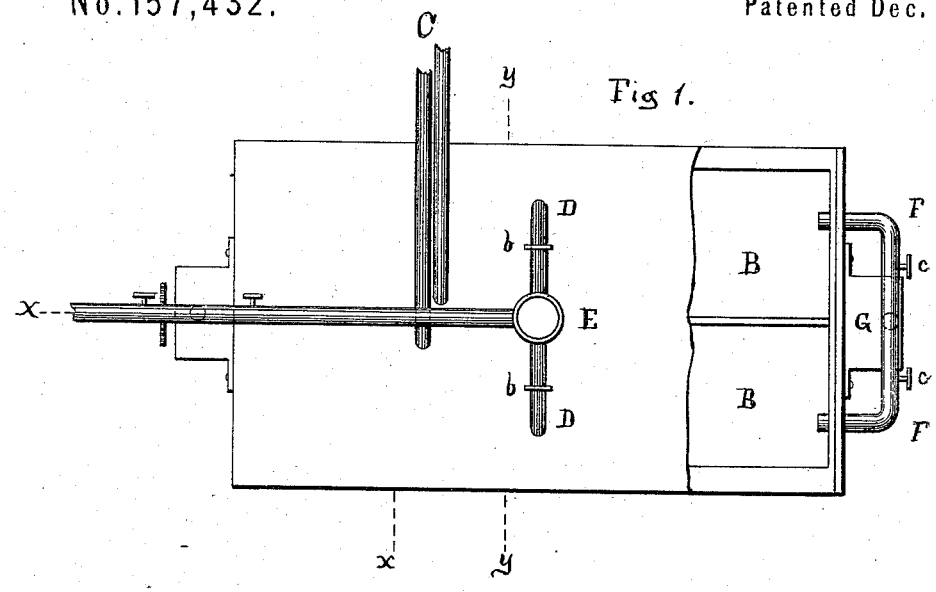
Figure 2:
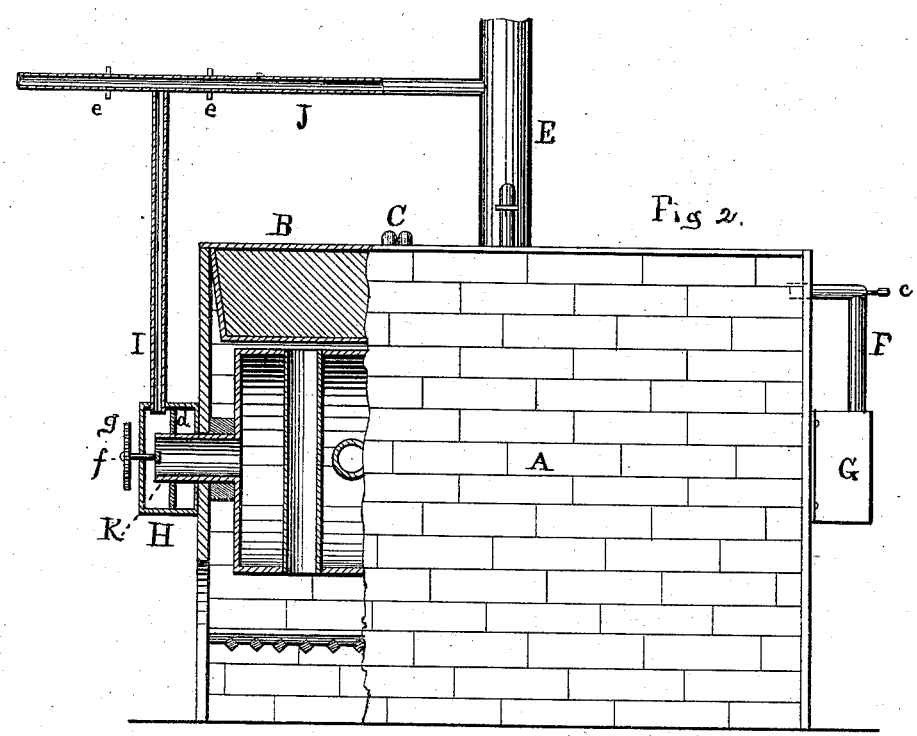

A is a furnace, which may be constructed of metal or brick, or any other suitable material, and provided with suitable grate-bars, upon which the fire is made, as shown in Figs. 2 and 4. B is a heater or tank, shown in Figs. 1, 2, and 4, for the reception of the materials from which the gas is made, and in which said materials are partially or wholly vaporized before passing into the retort, and may be subdivided into two or more compartments, as shown in Fig. 1, if desirable. The two pipes C C are intended to connect with tanks or reservoirs containing the oil and the water, and to convey said oil and water to the heater when and as required, the flow of which is regulated by suitable cocks $a'$, as shown in Fig. 3. D D are pipes leading from the heater B to the smoke-pipe E, and provided with suitable cocks $b$, through which the vapors from the heater are allowed to escape through the smoke-pipe, when shut off from entering the retort, as will be the case when the gasometer is filled with gas, or the flow of gas from the retort is cut off for any other cause, thereby overcoming the very great inconvenience of having the gas and vapors escape into the gas-house, as shown in Figs. 1, 3, and 4. F is a pipe leading from the heater to the retort, (and provided with a suitable cock or cocks, $c$,) through which the vapors or material pass from heater to the retort, the cocks being to regulate the flow of said vapors, or to cut off the flow altogether, under circumstances above indicated, as shown in Figs. 1 and 2. The pipe F does not connect directly with the retort, but discharges the vapors, &c., from the heater into a box, G, secured to the end of the furnace, as shown in Fig. 2, said box being divided into two compartments, separated by a partition, $d$, through which the hollow trunnions of the retort pass, and in which they revolve, the inner compartment serving as a packing-box, and is filled with a suitable packing, the outer compartment serving as a chamber for the reception of the vapors, and with which the retort communicates, as above set forth. One of the sides of said box should be made removable, for the purpose of affording access to the interior thereof, when necessary. A box, H, of similar construction and arrangement, is also secured to the opposite end of the furnace, and for the same purposes, except that the gas is discharged therein from the retort, and from thence passes into a pipe, I, leading therefrom, and connecting to a cross-pipe, J, one end of which connects with the smoke-pipe, and the other leading into a cooler, and thence into a gasometer, whence the gas is conducted, and from whence it is distributed, into the pipes for use, as shown in Fig. 2, said pipe J being provided with suitable cocks $e$, one of which lets the gas into the gasometer, or shuts it off therefrom when it is full, and the other to let any surplus gas escape through the smoke-pipe instead of into the gas-house.

An additional and very important advantage in thus providing for the escape of the gas through the smoke-pipe outside of the gas-house is, that when it becomes necessary to clean the retorts, which is frequently the case, all the gas contained in the retorts at such times escapes in this way, when, as heretofore, it has been allowed to escape in the gas-house, no other means for its escape being provided, and in such cases, besides the inconvenience occasioned to the operators, the gas sometimes takes fire, filling the room with smoke. My invention obviates all this, so that the gas-house may be kept clean and free from such annoyances. The hollow trunnions K, on which the retort revolves, are screwed or riveted to the center of each end or head of said retort. (See Figs. 1, 2, and 3.) In the center of the hollow trunnion, through which the gas is discharged from the retort into the box H, is secured the shaft $f$, which passes through the outside of said box H, and on which is adjusted a suitable gear or pulley, $g$, by means of which the retort is made to revolve either by steam, water-power, or weights. (See Fig. 2.)

In order to facilitate the removal of the retort from the furnace, when desirable, and without inconvenience or injury to the furnace, I construct a sliding gate, L, in the end of said furnace, extending from the top, down to the center of the trunnion, as shown in Fig. 3, which can be raised or removed for the purpose.

It may be here observed that instead of employing one revolving retort having the flues passing through it, as described, a series of two or more retorts, separate from each other, and connected by means of a pipe or pipes through their centers, may, if preferred, be substituted, and similar results obtained.

Having thus described my invention, what I claim as new, and desire to secure by Letters Patent of the United States, is—

1. A revolving retort, provided with the flues $a$, substantially as and for the purposes set forth.

2. In a revolving retort or retorts, provided with the hollow trunnions K, the boxes G and H, constructed and arranged substantially as described, for the purposes set forth.

In testimony that I claim the foregoing as my own invention I affix hereto my signature in presence of two witnesses.

JAMES H. VAN HOUTEN.

Witnesses:
GEO. H. WILSON,
GEO. W. FRANCIS.